United States Patent [19]

Siemens

[11] 3,981,286

[45] Sept. 21, 1976

[54] METHOD AND APPARATUS FOR FORMING AND BURNING A FUEL-AIR-MIXTURE IN AN AIR-COMPRESSING PISTON INTERNAL COMBUSTION ENGINE

[76] Inventor: Werner Erik Siemens, Parkallee, 28 Bremen 1, Germany

[22] Filed: Feb. 3, 1975

[21] Appl. No.: 546,789

[30] Foreign Application Priority Data

Feb. 1, 1974 Germany............................ 2404692

[52] U.S. Cl.......................... 123/139 AJ; 123/33 B; 123/33 C; 239/87; 239/533
[51] Int. Cl.² ........................................ F02M 49/02
[58] Field of Search............................ 239/87, 533; 123/139 AJ, 33 B, 33 C, 32 R

[56] References Cited
UNITED STATES PATENTS 1,162,789 12/1915 Loane, Jr. ...................... 123/139 AJ
1,376,277 4/1921 Higgins, Jr. ........................ 123/33 B

FOREIGN PATENTS OR APPLICATIONS 525,451 5/1931 Germany............................ 123/32 R Primary Examiner—Charles J. Myhre
Assistant Examiner—Tony M. Argenbright
Attorney, Agent, or Firm—Christie, Parker & Hale

[57] ABSTRACT

A method for forming and burning a fuel-air-mixture in an air compressing piston type internal type combustion engine. At least a portion of the air compressed in the combustion space of the working cylinder is tapped off. The tapped off portion is passed into a chamber which is in communication with the combustion space. A measured amount of fuel is injected through an injection nozzle into a fraction of the portion of air during its recirculation into the combustion space. The fraction of air and the injected quantity of fuel are together accelerated towards the combustion space conveying the thus formed mixture into the air present in the combustion space during combustion. The quantity of fuel injected is adjusted and determines the amount of the air fraction. An apparatus for practicing the aforegoing method is also disclosed.

11 Claims, 2 Drawing Figures

METHOD AND APPARATUS FOR FORMING AND BURNING A FUEL-AIR-MIXTURE IN AN AIR-COMPRESSING PISTON INTERNAL COMBUSTION ENGINE

BACKGROUND OF THE INVENTION

The invention concerns a method for forming and burning a fuel-air-mixture in an air-compressing piston internal combustion engine.

The invention concerns a method for forming and burning a fuel-air-mixture in an air-compressing piston internal combustion engine in which at least a portion of the air compressed in the combustion space of the working cylinder is tapped off and is conveyed to a chamber in communication with the combustion space and a measured quantity of fuel is injected through an injection nozzle into a fraction of the portion of air on its return into the combustion space. The fraction and the injected amount of fuel are together accelerated towards the combustion space and the thus formed mixture is introduced into the air present in the combustion space during combustion.

The object of this method known from German Patent Specification No. 525,451 is the formation of a particularly intimate homogeneous mixture. In order to achieve this, the same air-fraction is always conveyed from the chamber into the combustion space during each working stroke and furthermore mixed with the predetermined quantity of fuel dependent on the particular load range. At best, with this method of operation, the optimal mixture ratio of air and fuel can only be achieved at a single determined operational condition during the entire combustion procedure. However, if the operational conditions alter, as is the case with a partial load, then the (always the same) air-fraction is admixed with another (small) quantity of fuel which must necessarily lead to an unfavorable mixture ratio.

SUMMARY OF THE INVENTION

According to the present invention, in the interest of the most ideal mixture formation and burning possible, there is achieved an intimate intermixing of the air and fuel and always the formation of an optimal mixture proportion of air and fuel during the entire combustion phase, in order to thus realize optimal combustion conditions not only spatially but also at any moment throughout the entire combustion procedure.

According to the disclosed method the present invention achieves the foregoing by adjusting the amount of fuel to be injected so that the amount of fuel injected determines the appropriate air-fraction. Thus in this manner, contrary to the known method, the tapped off air is not mixed in toto with the fuel required for the particular operating condition, but only that air participates in the formation of the mixture and the combustion which is necessary for an optimal combustion of the particular amount of fuel required, wherein the regulation of the amount of air takes place automatically by only measuring the amount of fuel.

Preferably the invention is applicable to a piston internal combustion engine of the general type disclosed in the German Patent Specification No. 525,451. According to the disclosed embodiment of the invention there is a piston arranged between the working cylinder and the chamber, which is movable in the working cycle and which has an open duct connecting the combustion space to the chamber and the first end surface of which is subjected to the inner pressure, whereas a second end surface bounds the chamber in a manner enabling its volume to be varied. The piston is formed as a differential piston which is movable by the combustion space pressure on its larger end surface and the other end surface of which is supported by way of a partial region on a member which in its turn is supported by the fuel maintained under pressure for the injection in a closed space open however towards the injection nozzle. With this arrangement, as soon as the injection nozzle formed for example as an injection valve, opens and fuel is allowed to pass into the duct leading to the combustion space, the differential piston is displaced under the air pressure acting with a greater force on its larger end surface. Thus the volume of the chamber reduces and the air present therein is likewise displaced through the duct into the combustion space. As a result, fuel and air flow simultaneously and together through the duct to the combustion space wherein they are mixed in the duct and on passing into the combustion space are burned in a correspondingly uniform manner. Insofar as the invention is to be operated with spark ignition, a glow-electric incandescent ignition device is arranged at the larger end surface of the differential piston preferably in the region of the end of the duct.

The air displacement by a reduction in the chamber volume effected by the movement of the differential piston on its smaller piston end, can be so selected quantitatively that the displaced air corresponds to the particular simultaneously injected amount of fuel for an ideal combustion. The quantity of injected fuel can be varied by varying the injection period, for example, in the partial load region. Thus as soon as the injection valve is closed, the differential piston can no longer be displaced and the displacement of combustion air from the storage chamber also terminates. Before the start of each working stroke, the fuel space is provided with a predetermined quantity of fuel likewise at a predetermined pressure, so that at the start of the working stroke (start of the injection), the differential piston always has the same initial position. A non-return valve prevents the fuel flowing back towards the opening in the injection valve. The injection pressure is determined by the force with which the member is pressed against the available fuel by the small end surface of the differential piston. Due to the many times greater end area of the large end of the differential piston with respect to the cross-sectional area of the flexible member, that pressure is very high.

Preferably, the member is made tubular and is closed at one of its ends by the injection nozzle formed as an injection valve, and openings connect the chamber to the duct. The chamber is especially formed as a cylindrical space for the three stage differential piston appropriate to the member and coaxial with respect to the cylindrical space of the larger area of the differential piston. With this arrangement and construction, the apparatus in accordance with the invention can be produced with particularly small outlay. The injection valve injects the fuel directly into the duct preferably arranged in the center of the differential piston, and at the inlet end of the duct the air passes out of the chamber into the duct through the bores in the differential piston.

DESCRIPTION OF THE PREFERRED EMBODIMENT

Figure 1:
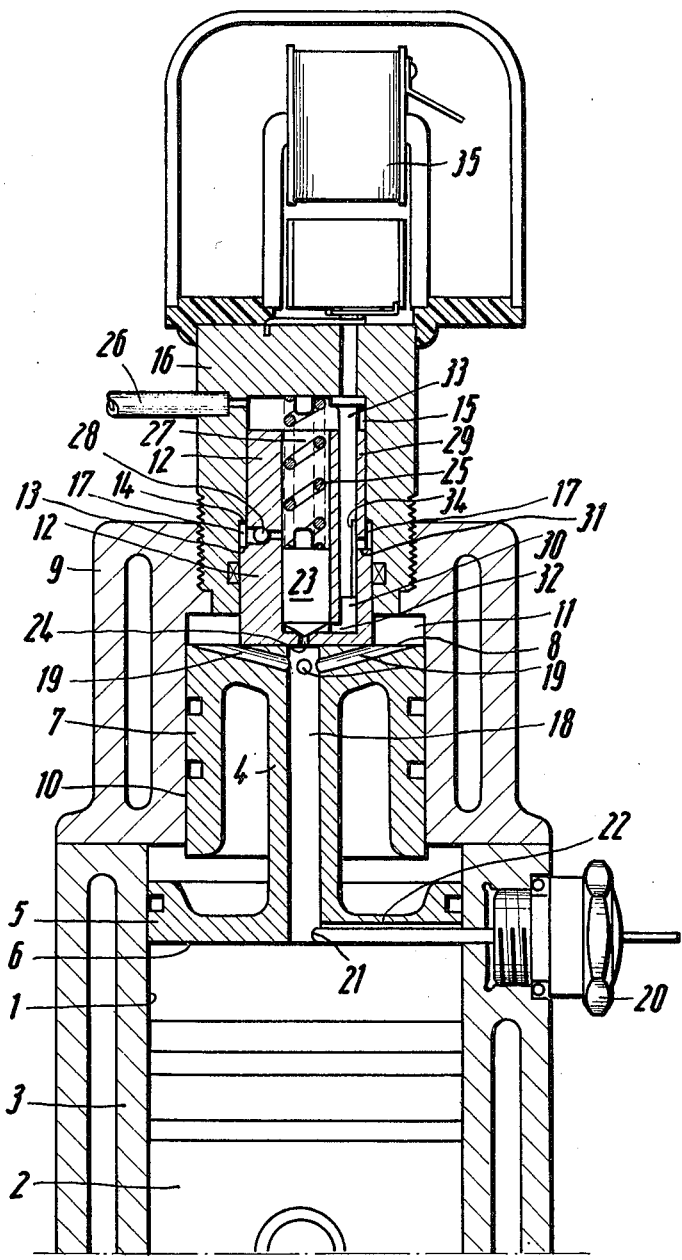
FIG. 1 is a central section through a partially represented working cylinder of a two-stroke internal combustion engine and the additional apparatus in accordance with the invention.

According to FIG. 1 a working piston 2 is arranged for reciprocation in the usual manner in a working cylinder and combustion space 1 of a two-stroke internal combustion piston engine. It is surrounded by a cooling jacket 3. A differential piston 4 is so arranged above a working piston 2 that the larger piston section 5 having the larger end surface 6, which in the example has the same diameter as the working piston 2, and is inserted directly into the working cylinder and combustion space 1, is directed towards the working piston 2. At the lower dead point of the differential piston 2 it nearly touches the working piston 2 when the latter is in its upper dead point.

The smaller piston section 7 of the differential piston 4 having the smaller end surface 8 is arranged in a cylindrical space 10 formed in the cylinder head 9 coaxially with respect to the working cylinder and combustion space 1, and there forms an annular shaped chamber 11 adjustable in volume. As an annulus, the chamber 11 surrounds a member 12 made piston-like and mounted likewise coaxially on the small end surface 8, which in this manner together with the differential piston 4, forms a three-stage piston.

In this example, the member 12 is provided with a step 13 and is arranged in a cylindrical space 15 provided with a complementary step 14 and axially displaceable in a housing 16 mounted on the cylinder head 9, so that between the step 13 of the member 12 and the step 14 of the cylindrical space 15 there is formed an annular closed space 17 the size of which is varied by longitudinal displacement of the member 12 together with the differential piston 4.

A centrally arranged duct 18 open towards the working cylinder and the combustion space 1 passes through the differential piston 4, which is in permanent communication with the chamber 11 through openings 19 near its end in the region of the small end surface 8. At the other end of the duct 18 in the region of the larger end surface 6, a glow plug 20 having an electrical incandescent ignition device 21 is so fixedly arranged that the ignition device 21 is located at the duct outlet. At the lower dead point of the differential piston 4, the electric supply leads enter a radial recess 22 in its larger end surface 6.

At the lower end of the member 12, which rests upon the smaller end surface of the differential piston 4, there is provided a central injection valve 23, the injection opening 24 of which issues coaxially into the duct 18. A spring 25 biases the injection valve 23 into the closed position. A fuel line 26 conveys fuel into the space 27 through the injection valve 23 and permits it to pass through a non-return valve 28 into the closed space 17 until, before the compression stroke of the working piston 2, the space 17 is filled with fuel to the maximum under a predetermined pressure; causing the differential piston 4 together with the flexible member 12 to be located in the lower dead point.

A bore 30 arranged in the housing 16 eccentrically with respect to the injection valve 23 and surrounded by a bushing 29 connects the closed space 17 with the injection valve 23 through radial bores 31 and 32. A control needle 33 longitudinally displaceably guided in the bore 30 has a recess 34 and can be remotely rotated by a control device 35. If the control needle 33 is located in the position illustrated in the drawing, then it opens the path from the closed space 17 to the bore 30 (and the openings 31, 32) to the injection valve 23. A rotation of the control needle 33 in the bore 30 closes the opening 31 and leads to the closure of the injection valve 23.

In operation the closed space 17 is first of all filled with fuel at a predetermined pressure, so that the otherwise unloaded differential piston 4 together with the member 12 takes up its lower dead point position. After the filling procedure the non-return valve 28 prevents a return flow of the fuel. During the subsequent compression of air in the working cylinder and combustion space 1, the latter is forced through the duct 18 and the passages 19 into the chamber 11 and indeed as a rule substantially completely. If thereafter the closed space 17 is opened towards the injection valve 23 by rotation of the control needle 33, then the fuel pressure opens the injection valve 23 and allows fuel to pass through the opening 24 into the duct 18. To the same extent in which the volume of fuel in the space 17 is reduced, the air pressure acting on the larger end surface 6 of the differential piston 4 displaces the differential piston together with the thus yielding member 12 upwards so that the air (which can only act on the smaller end surface 8 of the differential piston 4) present in the chamber 11 passes through the passages 19 likewise into the duct 18 where it mixes with the injected fuel while flowing through the duct 18 and is burned while passing into the working cylinder and combustion space 1.

Figure 2:
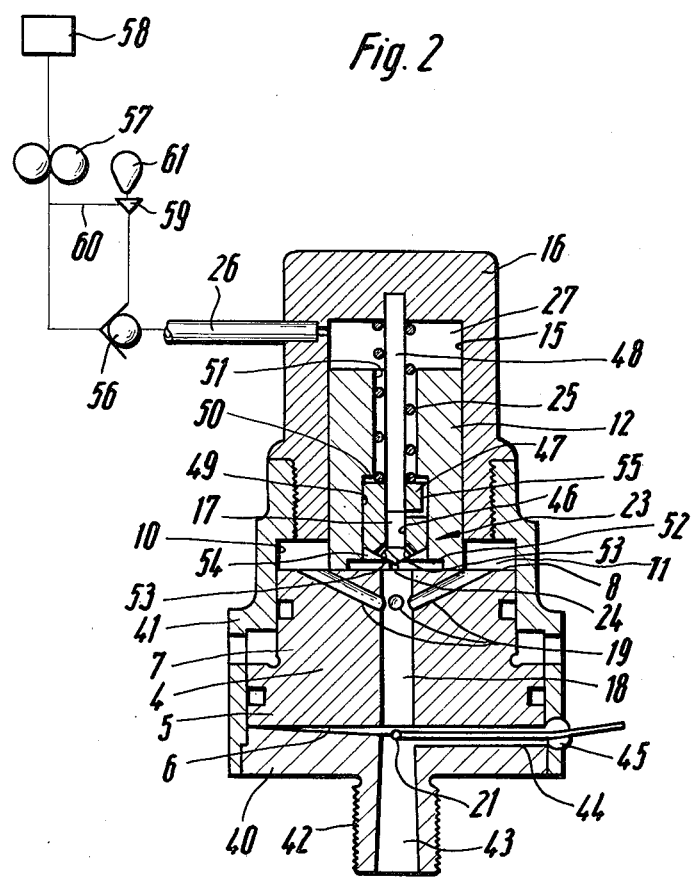
FIG. 2 is a section similar to FIG. 1 through a modified embodiment of the apparatus in accordance with the invention.

FIG. 2 shows a modified arrangement by way of example of the apparatus in accordance with the invention. Corresponding parts of the second embodiment are provided with the same references as those of the first embodiment. It differs first of all from the embodiment previously set forth in that the apparatus is not integrated into the cylinder head of the internal combustion engine and consequently does not rest directly upon the combustion space, but can be connected to the combustion space in itself closed from the outside. With a usual internal combustion engine this takes place for example by screwing it into the thread for a glow plug.

To this end, a base plate 40 is screwed into a housing 41 beneath a differential piston 4. The base plate 40 has a central connection 42 the concentric bore 43 of which extends the duct 18 in the differential piston 4 and diverges (Laval-Nozzle) towards its outlet. A radial recess 44 in the base plate 40 performs the same functions as the recess 22 in the first embodiment concerning the electric supply leads to the electric ignition device 21 which is sealed in the housing 41 at 45.

The housing 16 for the piston and tubular formed member 12 is similarly screwed into the housing 41 as in the first embodiment. However, contrary to the first embodiment, the construction and arrangement of the closed space 17 for the fuel is formed in this instance substantially by a central hollow bore 46 in a valve cone 47 of an injection valve 23. The open end of the hollow bore 46 is closed by the free end surface of a needle 48 in the form of a thin round rod which is rigidly anchored by its other end in the housing 16. On the one hand, the valve cone 47 is displaceably guided in a central bore 49 of the member 12, and on the other hand is displaceably guided in the direction of displacement of the member 12 on the needle 48 projecting into it. However, its path of displacement is limited by an annular shoulder 50 which is formed between the bore 49 and a coaxial bore 51 extending it into the flexible member 12.

A spring 25 surrounding the needle 48 is arranged in the bore 51, which abuts the housing 16 and urges the valve cone 47 against the nozzle plate 52 (with the nozzle opening 24) fixed in the tubular member 12. Bores 53 connect the space 17 to the annular space 54 formed within the bore 49 between the valve cone 47 and the nozzle plate 52. Furthermore, an overflow duct 55 is machined in the valve cone 47 which, in the initial position illustrated in FIG. 2, connects the space 17 (and with it also the space 54) through the bore 51 to the space 27, to which is conveyed fuel under pressure through the fuel supply line 26.

As is diagrammatically illustrated in FIG. 2, there is releasable non-return valve 56 in the fuel line 26 which allows fuel delivered by a fuel pump 57 to pass from a fuel storage tank 58 directly to a space 27, but in the closed normal condition prevents a return flow of the fuel. This blocking of the return flow is however removable by means of a releasing valve 59 which is arranged in a branch fuel line and is, for example, controlled by a cam 61.

In operation, during a suction stroke of the working piston (not shown) in the combustion space at the end of bore 43, the fuel supplied under pressure through line 26 forces the member 12 and with the latter the differential piston 4 into the initial position illustrated in FIG. 2. Simultaneously, the annular space 54 is filled with fuel at the same pressure through the bore 51 and the overflow duct 55 of the space 17 and further through the bores 53. After termination of the compression stroke, of the piston in the compression space, the non-return valve 56 is released by the release valve 59 under the influence of the cam 61 for the commencement of the working stroke, so that the fuel can flow back out of the space 27. Since the full compression pressure exists on the larger piston surface 6 of the differential piston 4, the pressure release in the space 27 leads to an immediate upward movement of the thus yielding member 12 together with the differential piston 4. With this movement, the needle 48 immediately closes the opening of the overflow duct 55 to the space 17 because in the initial condition the opening leads directly to the end surface of the needle 48 acting as a control edge, and during the upward movement of the member 12 the valve cone 47 is entrained above the nozzle plate 52. The consequence of that is that the member 12, due to the pressure release in the space 27, is then only supported by the fuel available for injection in the then closed space 17. Due to the small cross-sectional area of the space 17 in relation to the larger piston surface 6 of the differential piston 4, the pressure in the space 17 increases considerably. However, this pressure increase is also imparted to the fuel present in the annular space 54 and since pressure is no longer exerted on the rear of the valve cone 47 in the region of the shoulder 50 as a result of the release of the non-return valve 56, the fuel in the annular space 54, because it acts on a larger cross-sectional area of the valve cone than does the fuel in the space 17, raises the valve cone 47 within the bore 49 a maximum until it abuts the shoulder 50. Simultaneously, the fuel is injected from the annular space 54 through the nozzle opening 24 into the duct 18. The fuel following up from the space 17 permits the member 12 to yield further so that, as in the first embodiment, the air stored in the chamber 11 can pass through the passages 19 likewise into the duct 18. The thus formed mixture is ignited by the electric ignition device 21 and the combustion gas then passes through the bore 43 into the combustion space.

Of course, during the control path of the member 12 for closing the overflow duct 15 with respect to the space 17, no doubt some air to begin with passes out of the chamber 11 into the duct 18. However, this insignificant quantity of air plays no part. In this regard the control path amounts, for example, to only about 0.3 millimeters. The end of the injection procedure and with it also the passage of air out of the chamber 11 into the duct 18 is effected by a renewed closing of the non-return valve 56. The pressure thereby building up immediately in the space 27 and with it also behind the valve cone 47 in the region of the shoulder 50 prevents a further upwards movement of the member 12 and with it the passage of further air out of the chamber 11 into the duct 18 and permits the valve cone 47 to move back into its closed position illustrated in FIG. 2.

The combustion procedure can be an impulse procedure and proceed in accordance with the Diesel principle.

Depending on the particular relationships as to size and material, the differential piston 4 can at least partially be replaced by a diaphragm arrangement.

Althouth an exemplary embodiment of the invention has been disclosed for purposes of illustration, it will be understood that various changes, modifications and substitutions may be incorporated in such embodiment without departing from the spirit of the invention as defined by the claims appearing hereinafter.

I claim:

1. A method for forming and burning a fuel-air-mixture in an air compressing piston internal combustion engine comprising the steps of tapping off at least a portion of the air compressed in the combustion space of the working cylinder, passing the tapped off portion of air into a chamber which is in communication with the combustion space, injecting a measured amount of fuel through an injection nozzle into a fraction of said portion of air during its recirculation into the combustion space, accelerating said fraction of air and the injected quantity of fuel together towards the combustion space, conveying the thus formed mixture into the air present in the combustion space during combustion, adjusting the quantity of fuel injected, and adjusting the amount of said air fraction proportional to said quantity of injected fuel.

2. Apparatus for forming and burning a fuel-air-mixture in combination with an internal combustion engine having a working piston in a combustion chamber, the combination comprising:

a chamber, a differential piston movable under pressure in the direction of and away from said chamber and having a first large end surface for exposure to combustion pressure from such combustion chamber and a second smaller end surface limiting the volume of said chamber in accordance with the position of the differential piston, an open duct in the differential piston for connecting such combustion chamber and said chamber, a member abutting a portion of the second end surface, means including said member for defining a closed space variable in volume corresponding to fuel injected under pressure therein and thereby for controlling the position of said member, and an injection nozzle for receiving fuel from said closed space and for introducing fuel into the evacuation from said chamber.

3. The combination according to claim 2 wherein the member is tubular and whose center opening is closed at one of its ends by the injection nozzle, said injection nozzle being formed as an injection valve and comprising at least one passage for connecting the chamber to the duct.

4. The combination according to claim 2 comprising an electric incandescent ignition device arranged in the region of the end of the duct at the larger end surface of the differential piston.

5. The combination according to claim 2 wherein the chamber comprises a cylindrical space for the working piston, the differential piston and the member, the member being positioned coaxial with respect to the cylindrical space of the larger second end surface of the differential piston.

6. The combination according to claim 2 wherein the member comprises a cylindrical body having a step diameter providing a correspondingly annular stepped cylindrical space comprising the closed space.

7. The combination according to claim 3 comprising a fixed control needle projecting axially parallel into the member and longitudinally displaceable relative to the latter for controlling the opening time of the injection valve.

8. The combination according to claim 3 comprising a valve cone for the injection valve when biased in a closed position, the valve cone being displaceably guided centrally in the member in its direction of movement, a central hollow bore in the injection valve, a fixed needle projecting into the hollow bore for forming the closed space, a fuel line, an overflow duct in communication with the fuel line which communication is closeable by the needle, at least one bore in the injection valve for providing communication from the fuel line to the space between the injection nozzle and the valve cone and a releasable non-return valve in the fuel line.

9. The combination according to claim 8 comprising a cam controlled releasing valve for controlling the non-return valve with the aid of the fuel.

10. The combination according to claim 2 comprising a housing containing the differential piston and the member, and comprising thereon a base, and means for providing a threaded connection to the base plate and comprising a duct for providing an opening from the duct in the differential piston to the combustion space of the internal combustion engine.

11. Apparatus for forming and burning a fuel-air-mixture in combination with an internal combustion engine hving a working piston in a combustion chamber the combination comprising:

a housing having therein:
   a chamber,
   a differential piston movable under pressure in the direction of and away from said chamber and having a first large end surface for exposure to combustion pressure from said combustion chamber and a second smaller end surface limiting the volume of said chamber in accordance with the position of the differential piston,
   an open duct in the differential piston for connecting such combustion chamber and said chamber,
   a member abutting a portion of the second end surface,
   means including said member for defining a closed space variable in volume corresponding to fuel injected under pressure therein and thereby for controlling the position of said member, and
   an injection nozzle for receiving fuel from said closed space and for introducing fuel into the evacuation from said further chamber and said duct.

* * * * *